United States Patent [19]
Korenberg et al.

[11] Patent Number: 5,443,425
[45] Date of Patent: Aug. 22, 1995

[54] ADJUSTABLE CHAIN WHEEL AND COMPONENTS THEREOF

[75] Inventors: Hendrik J. Korenberg, Winterswijk; Arjen R. Roth, Doetinchem; Leonardus J. A. Tiggeloven, Groenlo, all of Netherlands

[73] Assignee: Stork R.M.S. B.V., Netherlands

[21] Appl. No.: 194,177

[22] Filed: Feb. 9, 1994

[30] Foreign Application Priority Data

Feb. 10, 1993 [NL] Netherlands ............... 9300268
Jun. 8, 1993 [NL] Netherlands ............... 9300985

[51] Int. Cl.[6] ............................................. F16H 55/12
[52] U.S. Cl. ............................................. 474/163; 474/902
[58] Field of Search ............................. 474/162–164, 474/273, 902

[56] References Cited

U.S. PATENT DOCUMENTS

| 649,563 | 5/1900 | Willson | 474/163 X |
|---|---|---|---|
| 811,134 | 1/1906 | Dufour | 474/163 X |
| 948,385 | 2/1910 | Willson | 474/163 X |
| 994,896 | 6/1911 | Willson | 474/163 X |
| 1,227,353 | 5/1917 | Willson | 474/163 |
| 1,244,383 | 10/1917 | Snider | 474/163 X |
| 1,244,384 | 10/1917 | Snider | 474/163 X |
| 1,493,863 | 5/1924 | Miller | 474/163 X |
| 1,633,746 | 6/1927 | Jereczek | 474/163 |
| 2,365,544 | 12/1944 | Geyer et al. | 74/243 |

FOREIGN PATENT DOCUMENTS

| 1396986 | 3/1965 | France | F16H 15/30 |
|---|---|---|---|
| 44052 | 8/1888 | Germany | F16H 15/30 |
| 165920 | 11/1903 | Germany | F16H 15/30 |
| 6701788 | 8/1968 | Netherlands | F16H 15/30 |

*Primary Examiner*—Roger J. Schoeppel
*Attorney, Agent, or Firm*—Webb Ziesenheim Bruening Logsdon Orkin & Hanson

[57] ABSTRACT

A tooth wheel intended to co-act with a transmission member with transmission elements, which tooth wheel bears a number of protrusions arranged on the periphery which are each provided with at least one contact surface for co-action with the transmission elements, including self-adjusting protrusions for adjusting the pitch of the contact surfaces, wherein each protrusion can swivel substantially in the main plane of the tooth wheel round at least one centre outside the connecting line between the centre line of the tooth wheel and the zone of engagement between the contact surface and a transmission element.

It is an object of the invention to embody a tooth wheel such that the distribution of the forces over the protrusions is better in the case of individual variations of the relevant pitch distances.

With a view to this object the tooth wheel according to the invention has the feature that during a swivelling of the relevant protrusion the contact surface of the transmission element co-acting therewith undergoes a substantial radial displacement in relation to the tooth wheel.

7 Claims, 4 Drawing Sheets

ADJUSTABLE CHAIN WHEEL AND COMPONENTS THEREOF

BACKGROUND OF THE INVENTION

The invention relates to a tooth wheel intended to co-act with a transmission member with transmission elements, for instance a chain with links or a toothed belt, which tooth wheel bears a number of protrusions arranged on the periphery, which protrusions are each provided with at least one contact surface for co-action with the transmission elements, comprising self-adjusting adjusting means for adjusting the pitch of the contact surfaces, wherein each protrusion can swivel substantially in the main plane of the tooth wheel round at least one centre outside the connecting line between the centre line of the tooth wheel and the zone of engagement between the contact surface and a transmission element. Such a tooth wheel is known from DE-C-165 920.

In relation to this prior art it is an object of the invention to embody a self-adjusting tooth wheel such that the distribution of the forces over the protrusions is better in the case of individual variations of the relevant pitch distances.

SUMMARY OF THE INVENTION

With a view to this object the tooth wheel according to the invention has the feature that during a swivelling of the relevant protrusion the contact surface of the transmission element co-acting therewith undergoes a substantial radial displacement in relation to the tooth wheel.

In a preferred embodiment the tooth wheel has the feature that the adjusting means comprise spring means.

The tooth wheel according to the invention can advantageously have the feature that each protrusion has at least two contact surfaces which are placed such that they can co-act simultaneously with contact surfaces on a transmission element, and each protrusion is guided slidably by two co-acting guide pins and slotted holes forming part of the tooth wheel and the protrusions, which slotted holes have a form such that the protrusion can undergo an angular displacement, wherein in the one extreme angular position the protrusion is pivotable round the one pin and in the other extreme angular position the protrusion is pivotable round the other pin.

In order to be certain that the protrusions are situated in the suitable position prior to engagement with the transmission elements, use can advantageously be made of resetting spring means which urge the contact surfaces to an extreme rest position. It is noted that the dimensioning of the tooth wheel must be such that at the beginning of the engagement with the transmission elements the contact surfaces can indeed come into contact with these elements.

The use of resetting spring means can be dispensed with under particular conditions, for instance in the case where, in the free, i.e. non-loaded situation of the protrusions, the latter are situated on the underside of a vertically disposed tooth wheel. It must then be ensured however that the force of gravity is sufficient to tilt the protrusions to the desired position while overcoming the associated friction forces.

The invention also relates to a protrusion intended to serve as component of a tooth wheel as specified above. This protrusion is characterized by means which are intended to co-act with means forming part of a disc such that they form adjusting means, this such that the disc forms with a number of such protrusions a tooth wheel according to any of the foregoing claims.

The invention further relates to a disc intended to serve as component of a tooth wheel as specified above. This disc is characterized by means which are intended to co-act with means forming part of a protrusion such that they form adjusting means, this such that the disc forms with a number of such protrusions a tooth wheel according to any of the foregoing claims.

BRIEF DESCRIPTION OF THE DRAWINGS

The invention will now be elucidated with reference to the annexed drawing. In the drawing.

DESCRIPTION OF THE PREFERRED EMBODIMENTS

Figure 1:
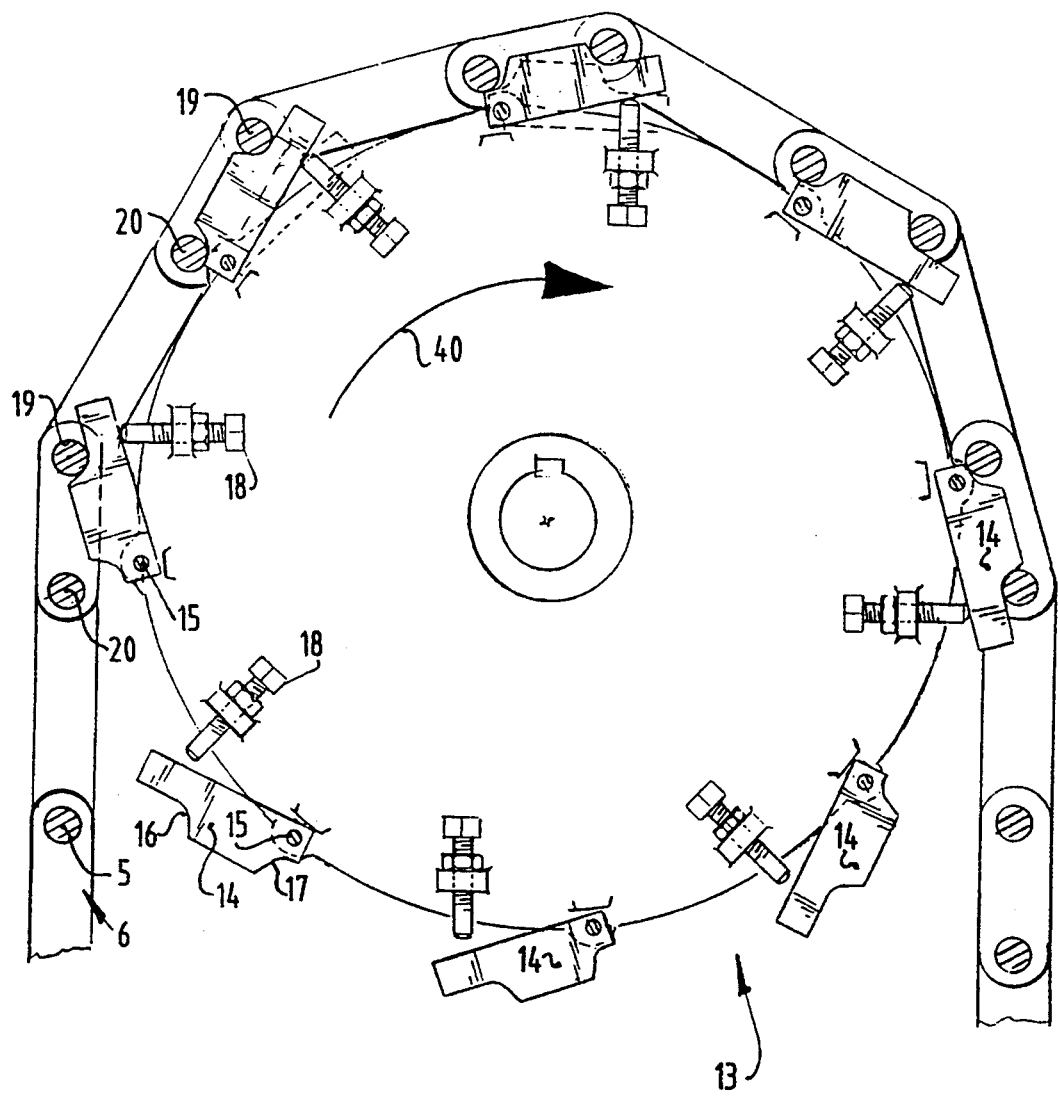
FIG. 1 shows a schematic view of an adjustable tooth wheel.

FIG. 1 shows a tooth wheel 13. The tooth wheel 13 according to FIG. 1 bears a number of protrusions 14 which are pivotable on pivot shafts 15. These protrusions each bear two concave contact surfaces designated respectively with 16 and 17. An adjustable stop in the form of an adjusting bolt 18 is added to each protrusion 14 and limits the inward stroke of the relevant protrusion. In this manner the adjusting of each bolt can take place on the basis of the effective pitch of the corresponding pivot shafts 19 such that the contact surfaces 16 have the same mutual pitch distance as the pivot shafts 19. The rotation direction is designated with an arrow 40.

As is shown clearly in FIG. 1, pivot shafts 19 co-act with the leading contact surfaces 16, while pivot shafts 20 co-act with the trailing contact surfaces 17. As can further be seen clearly in FIG. 1, the contact surface 16, 17 each have a form such that the positions of the pivot shafts 19, 20 in relation to the contact surfaces 16, 17 co-acting therewith are not fixed but permit a certain play.

Figure 2:
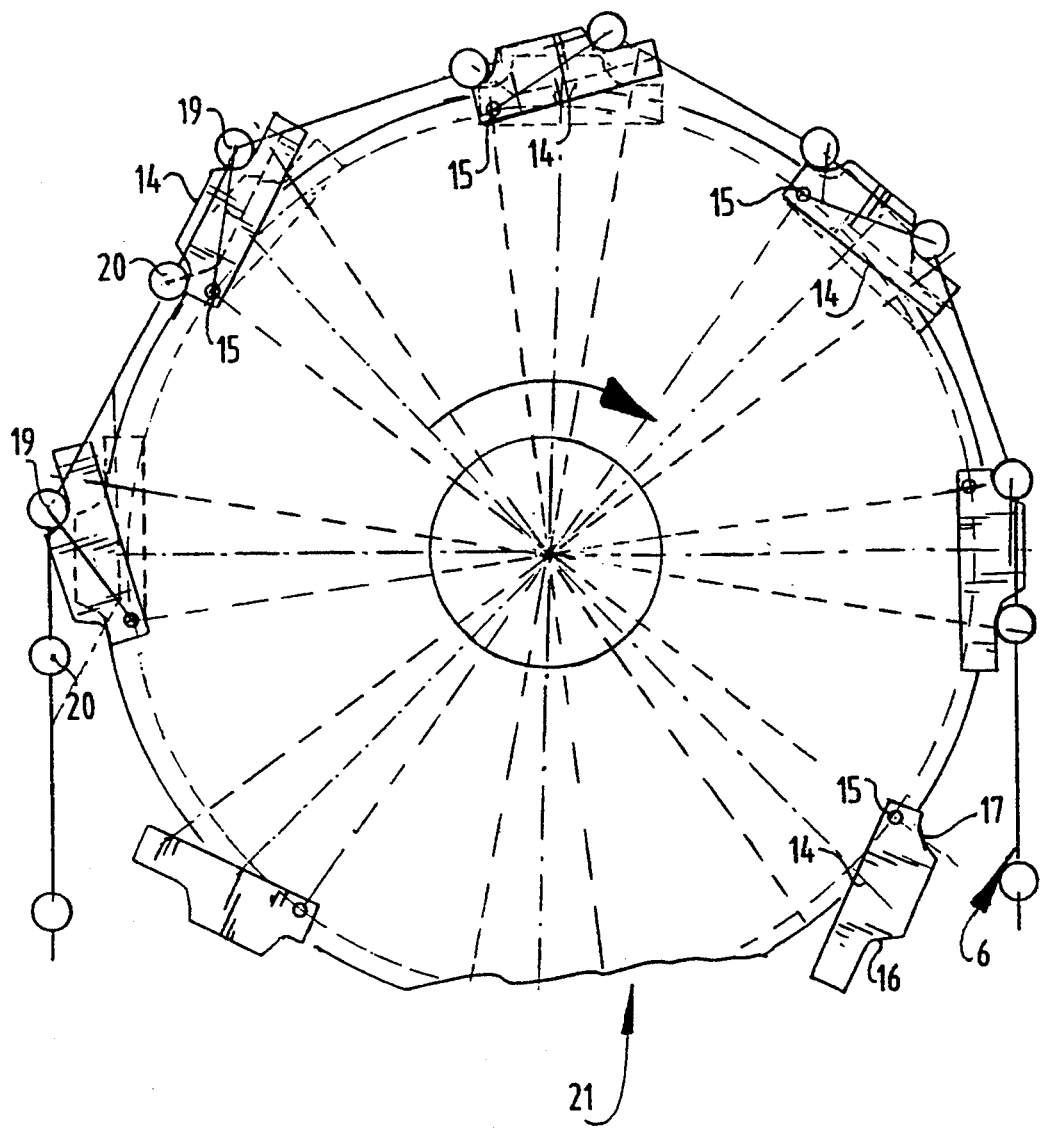
FIG. 2 is a schematic view in which is shown the manner in which the interaction of forces between the tooth wheel according to the invention and the chain according to FIG. 5 takes place.

FIG. 2 shows the manner in which by means of spring means (not shown) the tooth wheel according to FIG. 1 can be modified to obtain a self-adjusting tooth wheel according to the invention. The tooth wheel 21 has substantially the same structure as tooth wheel 13 according to FIG. 1. Corresponding elements are therefore designated here with the same reference numerals as in FIG. 1. Tooth wheel 21 is driven by a moment force M and thus drives the chain 6 by means of contact surfaces 16. The protrusions 14 are urged outward by means of spring means (not shown). In the position furthest to the left in FIG. 2, in which a link has come into contact with a protrusion 14, the preceding link has already pivoted in relation to the associated link. The tensile force in the chain can of course only intersect the line between the axes of the pivot shafts 19, 20. Should the relevant forces be resolved, they must then extend through the pivot shafts 15 for a mechanically stable situation. This self-adjusting action is obtained automatically because a resultant force which does not extend through a pivot shaft 15 results immediately in an associated displacement of the relevant protrusion 14, whereby the stable situation is obtained. Only at the moment when this condition of mechanical stability is fulfilled is a protrusion at rest.

Figure 3:
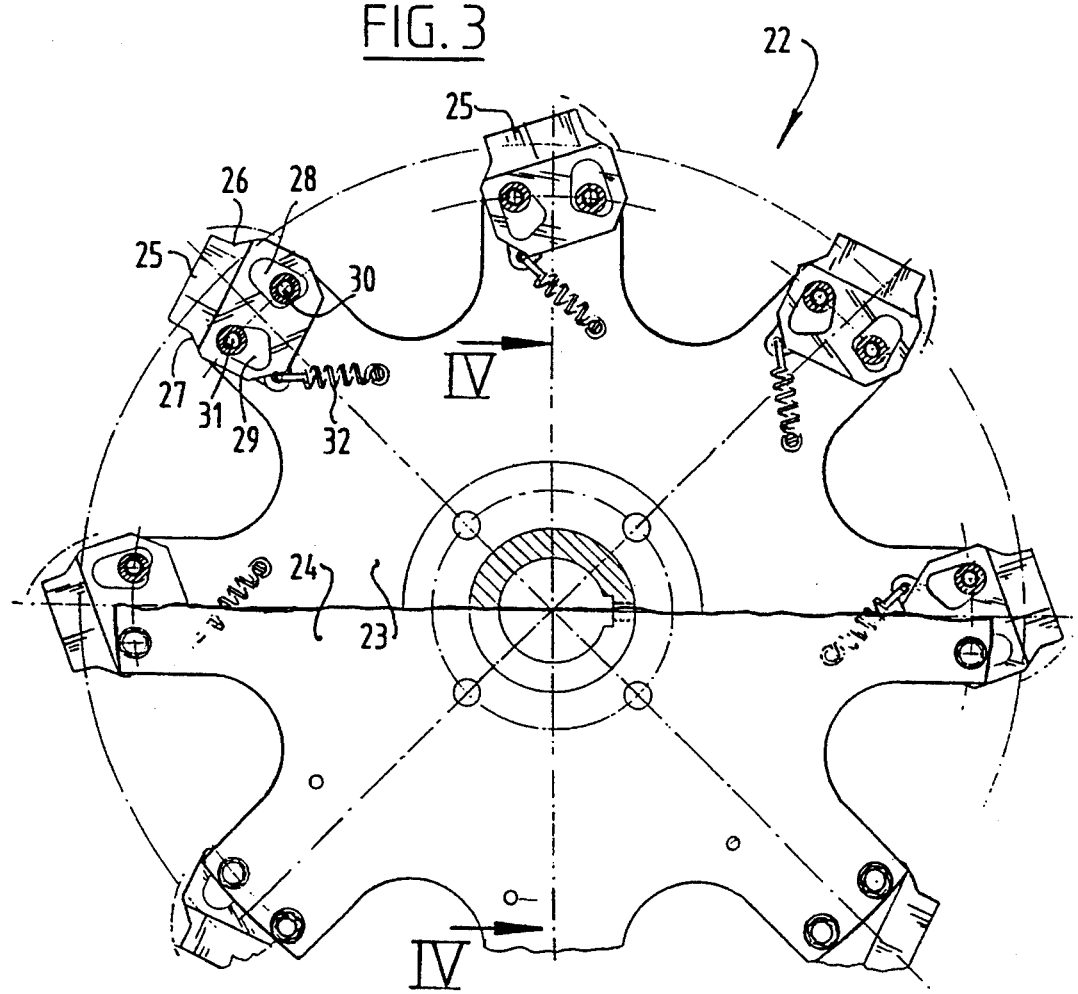
FIG. 3 shows an embodiment of the invention in partly broken away perspective view.
Figure 4:
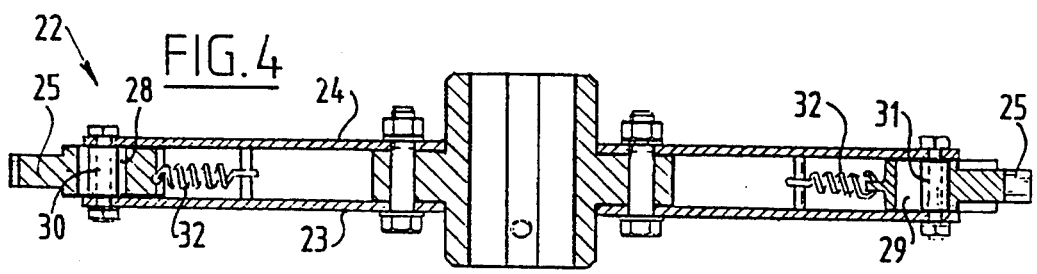
FIG. 4 shows the cross section V-V according to FIG. 2.

FIGS. 3 and 4 show a tooth wheel 22 which comprises two flanges 23, 24, between which symmetrical protrusions 25 are guided slidably. The protrusions 25 each have a leading concave contact surface 26 and a trailing concave contact surface 27. Each protrusion has two slotted holes, respectively a leading slotted hole 28 and a trailing slotted hole 29. Co-acting with the slotted holes are the respective guide pins 30, 31 which are connected to the flanges 23, 24. A resetting spring 32 urges each protrusion 25 into the active position shown on the left in which the protrusion 25 is pivotable round the guide pin 31. A power exchange with a relevant link of a chain (not drawn) can herein be transmitted by means of contact surface 26. Essential, as in the embodiment according to FIG. 2, is that this embodiment is self-adjusting due to the ability to pivot round the pin 31.

The protrusions 25 are detachable, as is particularly clear with reference to FIG. 4. It is therefore pointed out emphatically that the invention also relates to separate components, in particular the protrusions 25 and the disc consisting of the flanges 23, 24. The guide pins 30, 31 form first fixing means which are present on the disc 23, 24 and which together with the slotted holes 28, 29 in the protrusions 25 support these protrusions 25 detachably.

Figure 5:
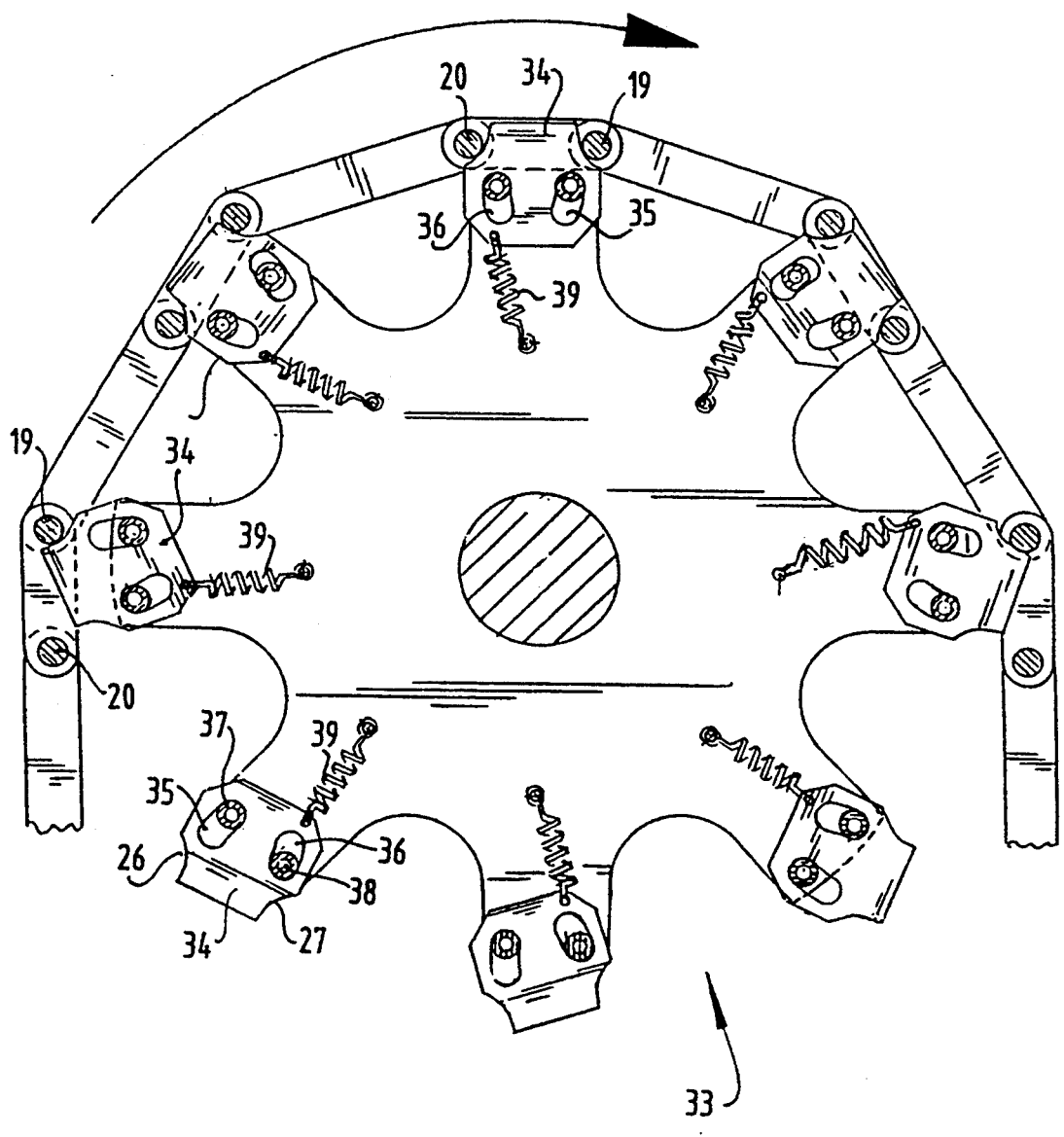
FIG. 5 shows a side view of a further embodiment, which is given preference.

FIG. 5 shows a tooth wheel 33 bearing slidably guided protrusions 34 which are each provided with two slotted holes 35, 36 which co-act with guide pins 37, 38 respectively. Slotted holes 35 and 36 are placed concentrically of the pins 38 and 37 respectively. As the figure shows, a first engagement of a link takes place by co-action of the leading contact surface 26 of a protrusion 34 with the pivot shaft 19. The protrusion 34 placed furthest to the left in FIG. 5 shows this situation. Pivoting takes place on the trailing pivot pin 38. In the top position in FIG. 5 the protrusion 34 rests with the ends of the slotted holes 35, 36 against the guide pins 37, 38. A pivoting then takes place round the leading guide pin 37. Resetting springs 39 urge the protrusions 34 to the shown extreme position. As shown in FIG. 5, contact with the shafts 19, 20 can take place with certainty in this extreme position.

It is noted that use of the resetting springs 39 could in principle be dispensed with in the case where tooth wheel 33 is disposed vertically, the chain extends over the upper portion thereof and the force of gravity is sufficient to tilt the protrusions 34 in the bottom left quadrant to the position indicated there. If desired use could also be made of cam means (not drawn) which in the said quadrant urge the protrusions 34 to the desired start position.

After the elucidation given above with reference to FIG. 2 it will be apparent that tooth wheel 33 is self-adjusting and inherently stable.

The tooth wheel according to FIG. 2 has a technical drawback. On the output side of the tooth wheel, thus in the zone where the chain leaves the tooth wheel, the situation can occur, in the case of very great stretch in the chain, in which the outermost teeth always absorb the greater part of the forces for transmitting. It will be apparent that this concentration of force can result in undesired wear. The embodiments of FIGS. 3, 4 and 5 do not have this drawback. A considerably better distribution of forces over the teeth takes place with these tooth wheels. This results in reduced wear and an increased effective lifespan.

Attention is further drawn to the fact that the embodiments of FIGS. 3, 4 and 5 could be simplified further by making each tooth swivellable, not round two centre lines located at a mutual distance, but round only one centre line. A tooth according to FIG. 3 can then for instance be pivotable round only one pivot axis which extends through the central zone of the tooth.

We claim:

1. A tooth wheel intended to co-act with a transmission member with transmission elements, said tooth wheel bearing a plurality of protrusions arranged on a periphery of said tooth wheel, which each said protrusion is provided with at least one contact surface for co-action with the transmission elements, each said protrusion comprising self-adjusting adjusting means for adjusting a pitch of said contact surfaces, wherein each said protrusion can swivel substantially in a main plane of said tooth wheel around at least one centre outside a connecting line between a centre line of said tooth wheel and a zone of engagement between said contact surface and a transmission element, wherein
during a swivelling of each said protrusion a contact surface of the transmission element co-acting therewith undergoes a radial displacement in relation to said tooth wheel.

2. The tooth wheel as claimed in claim 1, wherein said adjusting means comprise spring means.

3. The tooth wheel as claimed in claim 1, wherein each said protrusion has at least two contact surfaces which are placed such that they can co-act simultaneously with the contact surfaces on a transmission element, and each protrusion is guided slidably by two co-acting guide pins and slotted holes forming part of said tooth wheel and said protrusions, respectively, which said slotted holes have a form such that said protrusion can undergo an angular displacement, wherein in one extreme angular position said protrusion is pivotable around one said guide pin and in a second extreme angular position said protrusion is pivotable around the other said guide pin.

4. The tooth wheel as claimed in claim 3, further including resetting spring means which urge said contact surfaces to a rest position.

5. A tooth wheel intended to co-act with a transmission member with transmission elements, said tooth wheel bearing a number of protrusions arranged on a periphery of said tooth wheel, wherein each said protrusion has at least two contact surfaces which are placed such that they can co-act simultaneously with contact surfaces on a transmission element, said protrusions comprising self-adjusting adjusting means for adjusting a pitch of said contact surfaces, wherein each said protrusion can swivel substantially in a main plane of said tooth wheel around at least one centre outside a connecting line between a centre line of said tooth wheel and a zone of engagement between a contact surface and a transmission element, wherein during a swivelling of each said protrusion a contact surface of the transmission element co-acting therewith undergoes a radial displacement in relation to said tooth wheel, wherein each protrusion is guided slidably by two co-acting guide pins and slotted holes forming part of said tooth wheel and said protrusions, respectively, which said slotted holes have a form such that said protrusion can undergo an angular displacement, and wherein in one extreme angular position said protrusion is pivotable around one said guide pin and in a second extreme angular position said protrusion is pivotable around the other said guide pin.

6. The tooth wheel as claimed in claim 5, further including resetting spring means which urge said contact surfaces to a rest position.

7. The tooth wheel as claimed in claim 5, wherein said adjusting means comprise spring means.

* * * * *